(12) United States Patent
Segev et al.

(10) Patent No.: US 12,182,451 B2
(45) Date of Patent: Dec. 31, 2024

(54) DE-FRAGMENTATION ACCELERATION USING OVERLAP TABLE

(71) Applicant: Western Digital Technologies, Inc., San Jose, CA (US)

(72) Inventors: Amir Segev, Meiter (IL); Shay Benisty, Beer Sheva (IL)

(73) Assignee: Sandisk Technologies, Inc., Milpitas, CA (US)

( * ) Notice: Subject to any disclaimer, the term of this patent is extended or adjusted under 35 U.S.C. 154(b) by 1 day.

(21) Appl. No.: 18/355,097

(22) Filed: Jul. 19, 2023

(65) Prior Publication Data

US 2024/0192889 A1 Jun. 13, 2024

Related U.S. Application Data

(60) Provisional application No. 63/431,254, filed on Dec. 8, 2022.

(51) Int. Cl.
*G06F 12/00* (2006.01)
*G06F 3/06* (2006.01)

(52) U.S. Cl.
CPC .......... *G06F 3/0659* (2013.01); *G06F 3/0608* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 10,459,636 B2 | 10/2019 | Frid et al. | |
| 10,628,326 B2 | 4/2020 | Haswell | |
| 10,866,732 B2* | 12/2020 | Asano | G06F 3/0604 |
| 11,003,576 B2 | 5/2021 | Frolikov | |
| 11,003,587 B2 | 5/2021 | Haswell | |
| 11,199,983 B2 | 12/2021 | Frid et al. | |
| 2018/0004676 A1* | 1/2018 | Imazaki | G06F 11/1076 |

* cited by examiner

*Primary Examiner* — Daniel D Tsui
(74) *Attorney, Agent, or Firm* — PATTERSON + SHERIDAN, LLP (57) ABSTRACT

The present disclosure generally relates to improved fragment processing while command fetching is on-going. Rather than stopping command fetching, the controller uses a short fragment list, while command fetching can continue, to add a fragment. The controller first adds new fragments to the short list with the fragment information. The information is then checked for size. If the fragment information is smaller than the short fragment list, then the fragment list is updated during command fetching. As a command arrives, the controller does a binary search of a sorted fragment list. The results are stored and later scanned by the controller for matches with the short fragment list. If there are no matches in the short list, then the controller uses the stored results to update the search result. If there is a match in the short list then the controller uses the new results to update the search list.

20 Claims, 9 Drawing Sheets

DE-FRAGMENTATION ACCELERATION USING OVERLAP TABLE

CROSS-REFERENCE TO RELATED APPLICATIONS

This application claims benefit of U.S. provisional patent application Ser. No. 63/431,254, filed Dec. 8, 2022, which is herein incorporated by reference.

BACKGROUND OF THE DISCLOSURE

Field of the Disclosure

Embodiments of the present disclosure generally relate to improved fragment adding while command fetching.

Non-volatile memory express (NVMe) in solid state drives (SSD) includes multiple namespaces (NS). Each NS also includes multiple fragments. Each fragment may hold a different attribute (i.e. write-protect). All NS are stored in a defragmentation table as an entry, and NVMe drives are expected to hold such defragmentation tables. A command to change or add an entry may need to be executed.

Currently, when a request to add a fragment that is of the same start and size as the existing fragments, the command will be executed. The execution of the command comes without stopping the fetching of commands. However, when a command requests to add or remove an entry that is either the start of the fragment, the middle of the fragment, or the end of the fragment, then fetching of commands is stopped. The fetching of the commands is stopped to make changes to table. As many entries as the table is able to hold may be added. In previous approaches the tables were changed. Only once tables were changed and then updated would the controller re-enable fetching of commands which will increase system degradation causing a decrease in command fetching efficiency.

Therefore, there is a need in the art for improved fragment adding while command fetching.

SUMMARY OF THE DISCLOSURE

The present disclosure generally relates to improved fragment processing while command fetching is on-going. Rather than stopping command fetching, the controller uses a short fragment list, while command fetching can continue, to add a fragment. The controller first adds new fragments to the short list with the fragment information. The list is then checked for size. If the short fragment list is not full, then the short fragment list is updated during command fetching. As a command arrives, the controller does a binary search of a sorted fragment list. The results are stored and later scanned by the controller for matches with the short fragment list. If there are no matches in the short list, then the controller uses the stored results to update the search results. If there is a match in the short list then the controller uses the new results to update the search result.

In one embodiment, a data storage device comprises: a memory device; and a controller coupled to the memory device, wherein the controller is configured to: maintain a defragmentation table; receive a request to add a fragment to the defragmentation table; store the added fragment in a fragment list, wherein the fragment list is distinct from the defragmentation table; and update the defragmentation table with entries from the fragment list; and clear the fragment list.

In another embodiment, a data storage device comprises: a memory device; and a controller coupled to the memory device, wherein the controller is configured to: maintain a defragmentation table; maintain a fragment list, wherein the fragment list is distinct from the defragmentation table; fetch a command; search the defragmentation table for data of the command; store results of the search; search the fragment list for data of the command; determine whether the fragment list contains a match for the command; and utilize either the stored results or results of searching the fragment list for executing the command.

In another embodiment, a data storage device comprises: memory means; and a controller coupled to the memory means, wherein the controller is configured to: maintain a defragmentation table and a separate fragment list, wherein the fragment list is stored in an overlap table module and the defragmentation table is stored in a fragments table module; update the fragment list prior to updating the defragmentation table; and search the defragmentation table prior to searching the fragment list.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to improved fragment processing while command fetching is going on. Rather than stopping command fetching, the controller uses a short fragment list, while command fetching can continue, to add a fragment. The controller first adds new fragments to the short list with the fragment information. The list is then checked for size. If the short fragment list is not full, then the short fragment list is updated during command fetching. As a command arrives, the controller does a binary search of a sorted fragment list. The results are stored and later scanned by the controller for matches with the short fragment list. If there are no matches in the short list, then the controller uses the stored results to update the search results. If there is a match in the short list then the controller uses the new results to update the search result.

Figure 1:
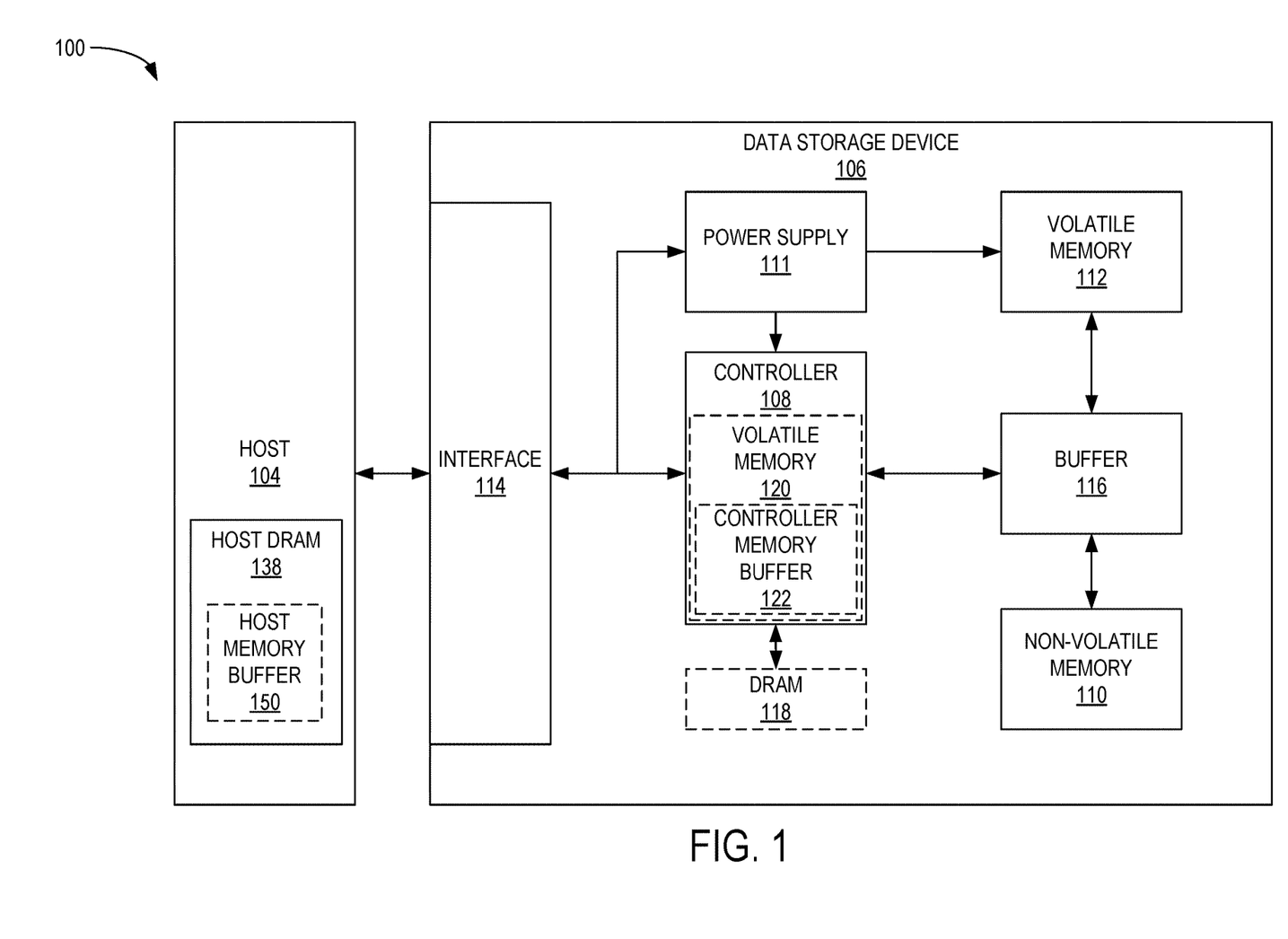
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe ×1, ×4, ×8, ×16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

Figure 2:
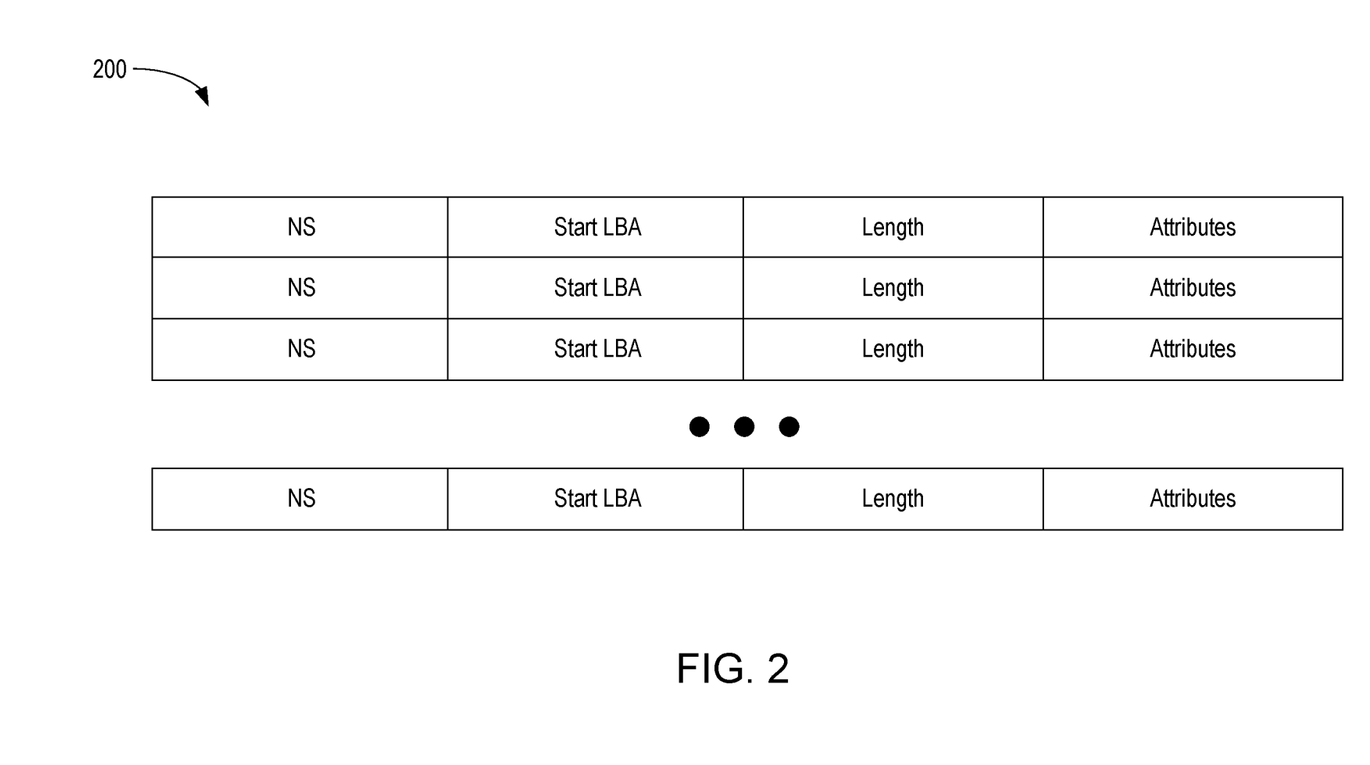
FIG. 2 is a table illustrating a read flow command, according to certain embodiments.

FIG. 2 is a table 200 illustrating a read flow command, according to certain embodiments. Each entry in the table corresponds to a specific namespace (NS) and a range of logical blocks (Start LBA to Start LBA+Length−1). The length of each entry will not always be the same size. Each entry holds different attributes.

When a command arrives, the controller needs to look at the table to extract the required attribute. The list can be a very large (in some application like in embedded systems software (eSS) drives) as much as 16K entries long. Looking at such a large table would take considerable time to look through. As such, the list is kept sorted, so a binary search can be performed.

FIGS. 3A-3D are collectively a flow chart illustrating a method 300 of adding fragment to a flow, according to certain embodiments. The flow starts by searching the database. If the match is full (same start and size) with existing fragments/entries, the flow updates the new attribute and the process is completed. However, if the new fragment is partial (middle, start or end) of an existing fragment, the flow needs to stop fetching commands. The flow then waits for the already fetched commands to pass through the attribute matching table, manipulate the table, and only then allow commands to be re-fetched. The flow suggests an algorithm to update the table: start by moving entries past the match entry by 1 (i.e., start of end match) or 2 (i.e., middle match) and then updating the 2 or 3 relevant entries to the new required fragmentation.

Figure 3A:
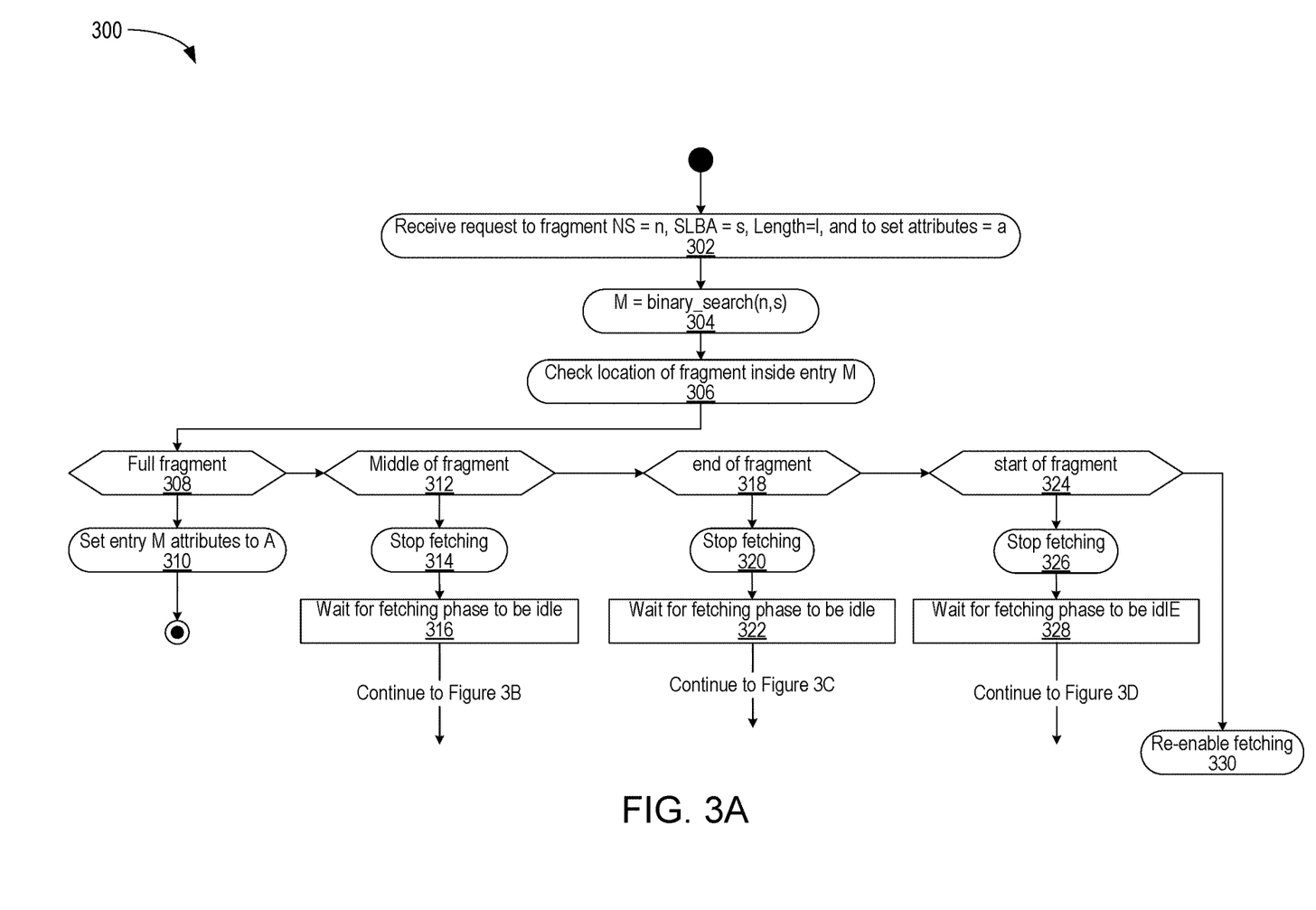
FIGS. 3A-3D are collectively a flow chart illustrating a method of adding fragment to a flow, according to certain embodiments.

Method 300 begins at block 302 with receiving a request to fragment the NS and set the attributes. At block 304, there is a binary search of entry M (M=binary_search(n,s)). At block 306, the controller checks the location of the fragment inside entry M. If the controller determines at the completion of block 306 the fragment location to be full, method 300 continues to block 308. At block 308, the controller determines the fragment to be full. At block 310, the controller sets the attributes to A of entry M and the table update is completed.

If the controller determines at the completion of block 306 the fragment location to be the middle of the fragment, method 300 continues to block 312. At block 312, the controller determines the fragment location to be the middle of the fragment. At block 314, the controller stops fetching commands. At block 316, the controller waits for fetching phase to be idle. If the controller determines at the completion of block 306 the fragment location to be the end of the fragment, method 300 continues to block 318. At block 318, the controller determines the fragment location to be the end of the fragment. At block 320, the controller stops fetching commands. At block 322, the controller waits for fetching phase to be idle. If the controller determines at the completion of block 306 the fragment location to be the start of the fragment, method 300 continues to block 324. At block 324, the controller determines the fragment location to be the start of the fragment. At block 326, the controller stops fetching commands. At block 328, the controller waits for fetching phase to be idle. At block 330, the controller re-enables fetching for commands.

Figure 3B:
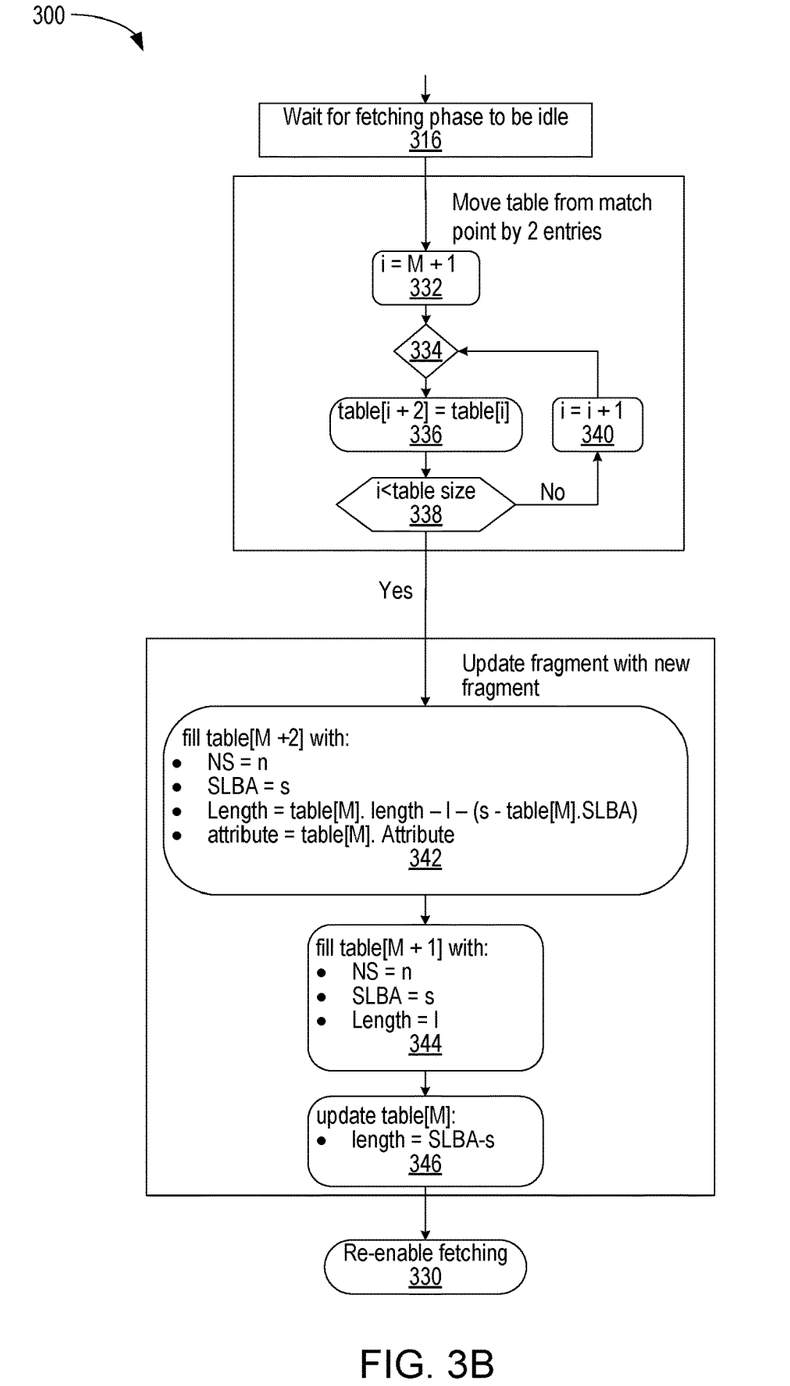

FIG. 3B is a continuation of the flow chart illustrating a method 300 of adding middle fragment. The flow waits for the already fetched commands to pass through the attribute matching table, manipulate the table, and only then allow commands to be re-fetched.

The defragmentation table is then moved from match point by two entries. It is to be understood that though the table is moved from match point by two entries, the match point can be moved by more or less than the two entries. At the completion of block 316 method 300 proceeds to block 332. At block 332, the controller confirms "i=M+1". At block 334, the controller determines that "i=M+1". At block 336 the controller confirms "table[i+2]=table[i]". At block 338, the controller determines whether "i<table size". If the controller determines "i" to be a greater value than that of the table then the method proceeds to block 340. At block 340, the controller confirms "i=i+1" and returns to block 334. If the controller determines "i" to be a lesser value than that of the table at block 338 then the method proceeds to block 342. At block 342, the controller fills table[M+2] with: NS=n; SLBA=s; Length=table[M].length-1-(s-table[M].SLBA); attribute=table[M].Attribute. Method 300 continues at block 344. At block 344, the controller fills table [M+1] with: NS=n; SLBA=s; Length=1. Method 300 continues to block 346. At block 346, the controller updates table[M] with: length=SLBA-s. Once block 346 is completed, method 300 proceeds to block 330 to re-enable fetching of commands.

Figure 3C:
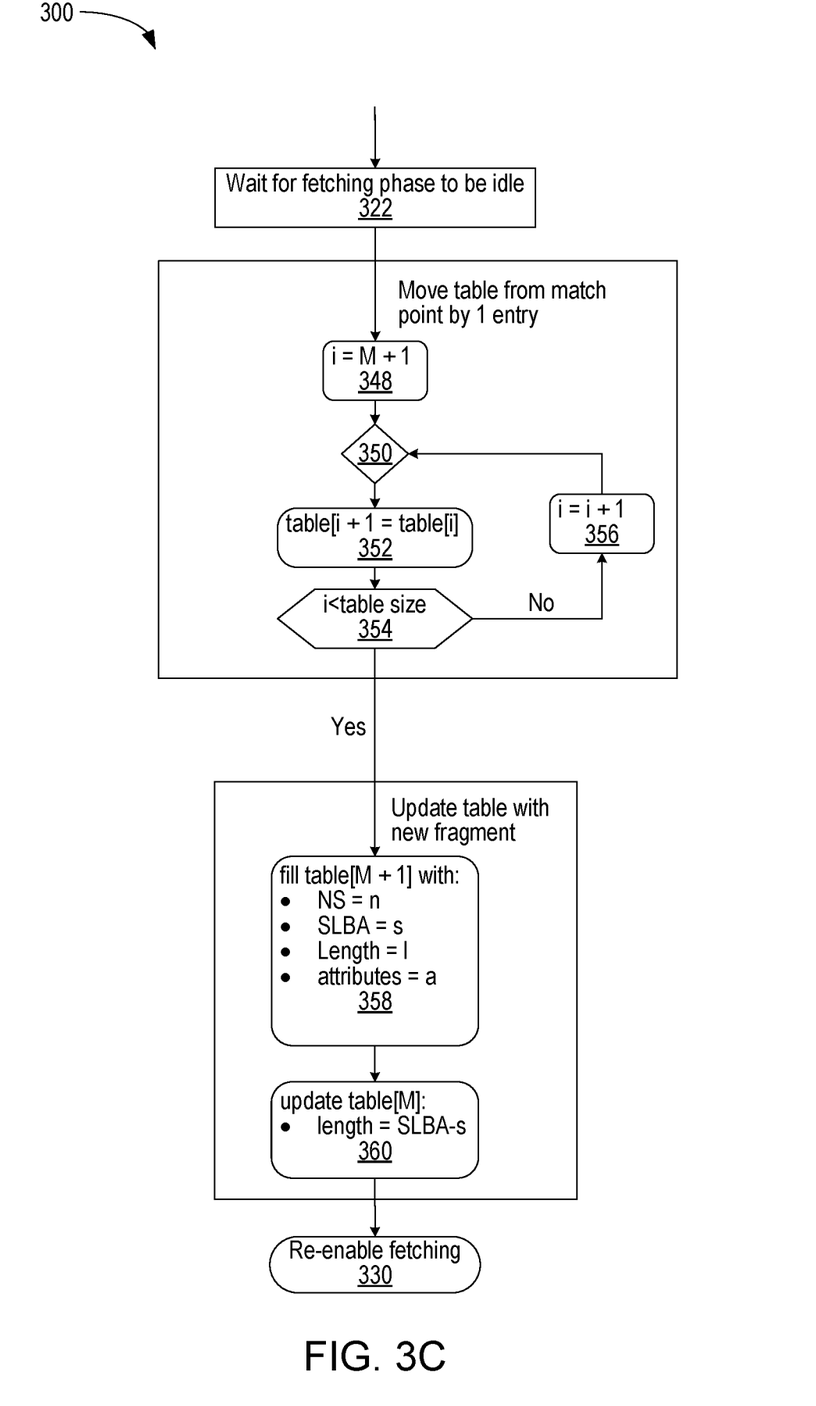

FIG. 3C is a continuation of the flow chart illustrating a method 300 of adding an end fragment. The flow waits for the already fetched commands to pass through the attribute matching table, manipulate the table, and only then allow commands to be re-fetched.

Method 300 continues at block 322 with the controller waiting for fetching phase to be idle. The defragmentation table is then moved from match point by one entry. At the completion of block 322 method 300 proceeds to block 348. At block 348, the controller confirms "i=M+1". At block 350, the controller determines that "i=M+1". At block 352 the controller confirms "table[i+1]=table[i]". At block 354, the controller determines whether "i<table size". If the controller determines "i" to be a greater value than that of the table then the method proceeds to block 356. At block 356, the controller confirms "i=i+1" and returns to block 350. If the controller determines "i" to be a lesser value than that of the table at block 354 then the method proceeds to block 358. At block 358, the controller fills table[M+1] with: NS=n; SLBA=s; Length=1; attribute=a. Method 300 continues to block 360. At block 360, the controller updates table[M] with: Length=SLBA-s. Once block 360 is completed, method 300 proceeds to block 330 to re-enable fetching of commands.

Figure 3D:
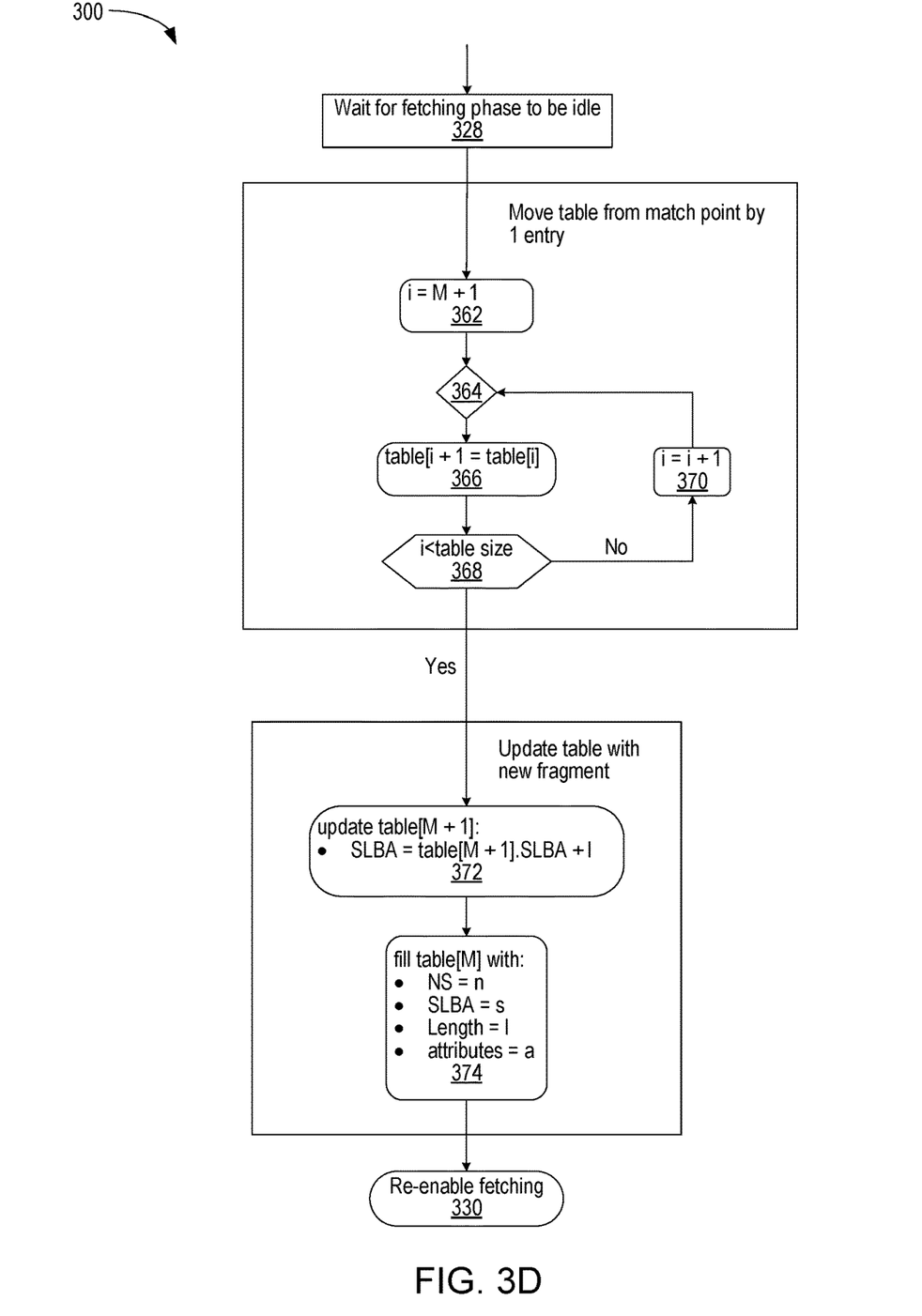

FIG. 3D is continuation of the flow chart illustrating a method 300 of adding start fragment. The flow waits for the already fetched commands to pass through the attribute matching table, manipulate the table, and only then allow commands to be re-fetched.

Method 300 continues at block 328 with the controller waiting for fetching phase to be idle. The table is then moved from match point by one entry. At the completion of block 328 method 300 proceeds to block 362. At block 362, the controller confirms "i=M+1". At block 364, the controller determines that "i=M+1". At block 366 the controller confirms "table[i+1]=table[i]". At block 368, the controller determines whether "i<table size". If the controller determines "i" to be a greater value than that of the table then the method proceeds to block 370. At block 370, the controller confirms "i=i+1" and returns to block 364. If the controller determines "i" to be a lesser value than that of the table at block 368 then the method proceeds to block 372. At block 372, the controller fills table[M+1] with: SLBA=table[M+1].SLBA+l. Method 300 continues to block 374. At block 374, the controller updates table[M] with: NS=n; SLBA=s; Length=l; attributes=a. Once block 374 is completed, method 300 proceeds to block 330 to re-enable fetching of commands.

Figure 4:
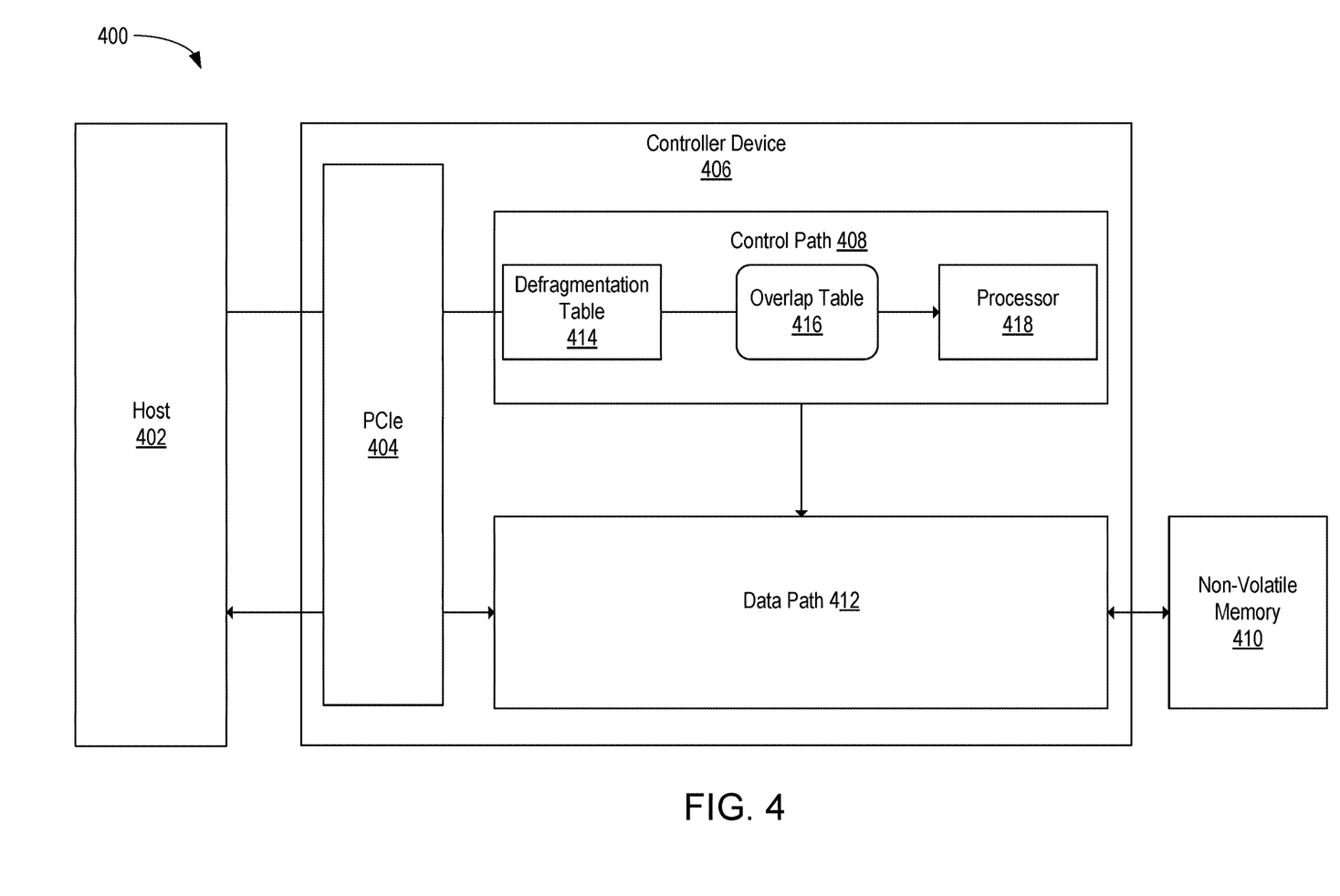
FIG. 4 is a schematic block diagram illustrating a SSD system, according to certain embodiments.

FIG. 4 is a schematic block diagram illustrating a SSD system 400, according to certain embodiments. System 400 shows a host device 402, a device controller 406 and a NVM 410. The controller 406 is further partitioned to a control path 408 and data path 412. The control path 408 accepts commands and, as the last part of the control path's piped operation, the control path 408 triggers the data path 412 to execute commands. Two parts of the pipe operations include: looking at the defragmentation table 414, and looking at an overlap table 416. The overlap table is required to handle write-cache: write commands that have data in local RAM that was not yet written to the NVM. The commands not yet written need special treatment.

The system 400 comprises the host device 402, device controller 406, and NVM 410. The system 400 may function as a storage device for the host device 402. For instance, the host device 402 may utilize NVM 410 to store and retrieve data.

The device controller 406 includes a control path 408, a data path 412, and a PCIe bus 404. Control path 408 may include a defragmentation table 414. The defragmentation table 414 will be the first stop for a command to receive information of the stored fragment and will keep the results. The defragmentation table 414 is so large the full table will not be duplicated. Control path 408 further includes an overlap table 416. Overlap table 416 is not sorted and has high performance. The results kept from the defragmentation table 414 will be compared with the information in the overlap table 416. The overlap table 416 is very expensive, because all the entries need to be looked through, at a high-performance rate. As such, the overlap table 416 is kept relatively small, smaller than the defragmentation table 414. For even quicker scans, the user can add an additional overlap table to separate the sorted fragmentation list and the unsorted short fragmented list. Control path 408 further includes a processor 418.

As will be discussed herein, using separate, short, and unsorted lists of fragments is beneficial. The list will override a sorted fragmentation list attributes and will be merged when the short fragmented list is full or there are otherwise no commands to be fetched. The overlap table is a temporary solution for fragments, and any short fragmented list that is unsorted may be beneficial.

Figure 5A:
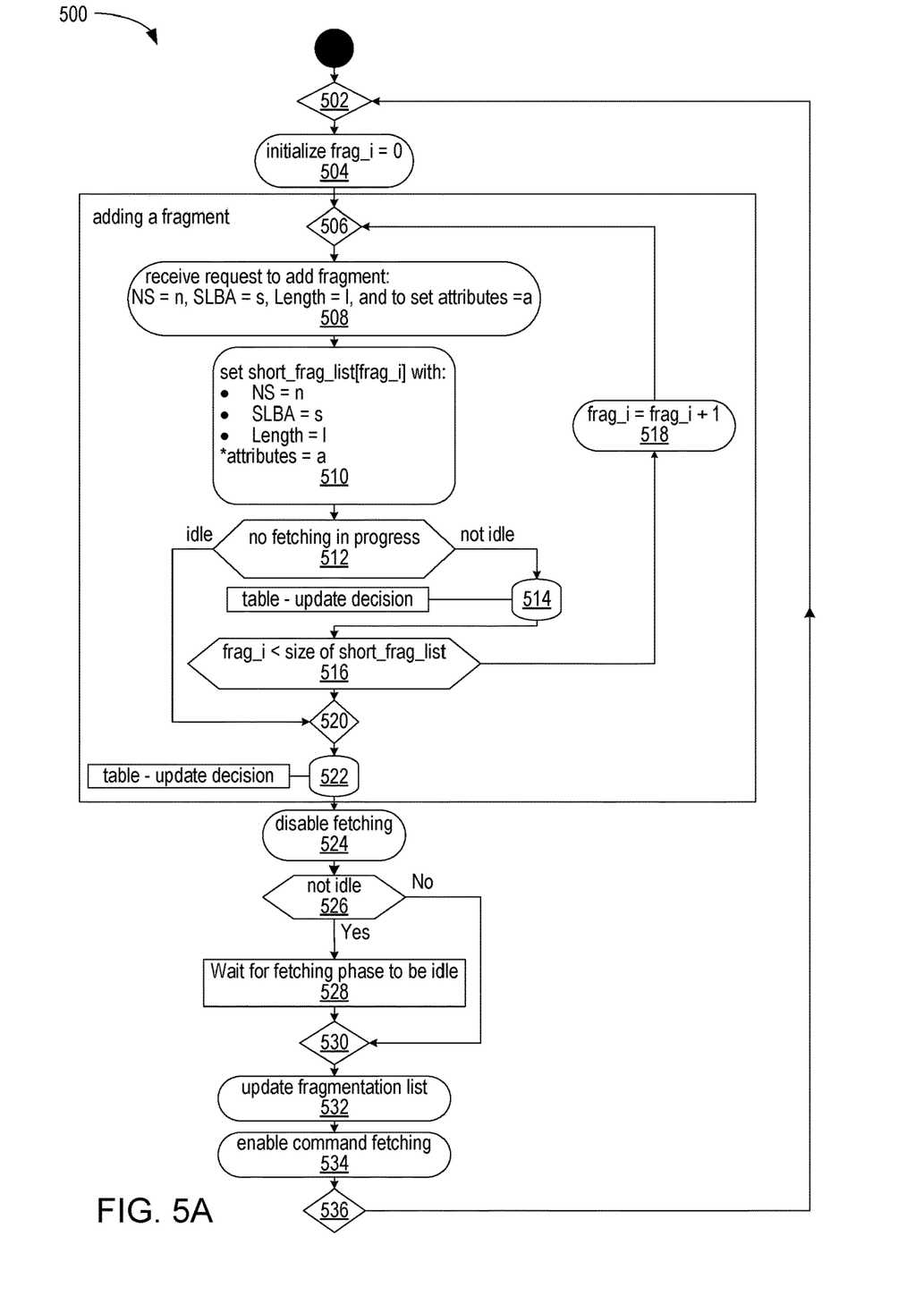
FIG. 5A is a flow chart illustrating a method of managing tables, according to certain embodiments.

FIG. 5A is a flow chart illustrating a method 500 of managing tables, according to certain embodiments. When a new fragmentation request arrives, the request is added to the end of the short-list. If the list is full, or the command arrival flow is idle, the sorted-fragmentation-list gets updated. If the list is not full, then the end-of-short-list "frag_i" is incremented.

To update the sorted list, the fetching is disabled and waiting until the fetching pipe is clear and is in idle. Then the sorted fragmentation list gets updated, and command fetching is enabled. Finally, the end-of-short-list pointer "frag_i" is cleared back to 0, as the list is now empty. In another embodiment, the device will not look at the fetching-idle condition, and will only update the list when the short-unsorted list is full.

Method 500 begins at block 502 where the controller determines to proceed to block 504. At block 504, the controller initializes "frag_i=0". The controller now prepares to add a fragment. At block 506, the controller determines to proceed to block 508. At block 508, the controller receives the request to add fragment: NS=n, SLBA=s, Length=l, and to set attributes=a. At block 510, the controller sets short_frag_list[frag_i] with: NS=n; SLBA=s; Length=l; *attributes=a. The short_frag_list is a duplicate of the information in the overlap table 416. At block 512, the controller determines whether no fetching is in progress. If the controller determines the fetching to be idle then method 500 proceeds to block 520. If the controller determines the fetching is not idle then method 500 proceeds to block 514. At block 514, a table update decision is made to proceed to block 516. At block 516, the controller determines whether the size of the fragment "frag_i" is less than the short fragmented list "short_frag_list". If the short list is full, then the fragment will have to request to be added again. If the controller determines the fragment to be less than the short fragmented list, then method 500 proceeds to block 520. At block 520 the controller determines to proceed to the block 522. If the controller determines at block 516 the new fragment to be greater than the short fragmented list then method 500 proceeds to block 518. At block 518, the controller confirms "frag_i=frag_i+1" and returns to block 506.

After the determination at 520, method 500 proceeds to block 522. At block 522, a table update decision is made to proceed to block 524. At block 524, the controller disables fetching of commands. The controller will only will disable fetching if the defragment table is full. At that time, the controller will wait for the fetching to become idle to return to proceed to block 526. At block 526, the controller determines if the fetching is not idle. If the controller determines the fetching is idle then method 500 proceeds to block 530. If the controller determines the fetching is not idle, then method for proceeds to block 528. At block 528, the controller waits for the fetching phase to become idle. At block 530, the controller determines to proceed to block 532. At block 532, the controller updates the fragmentation list. At block 534, the controller enables command fetching. At block 536, the controller determines to return to block 502.

Figure 5B:
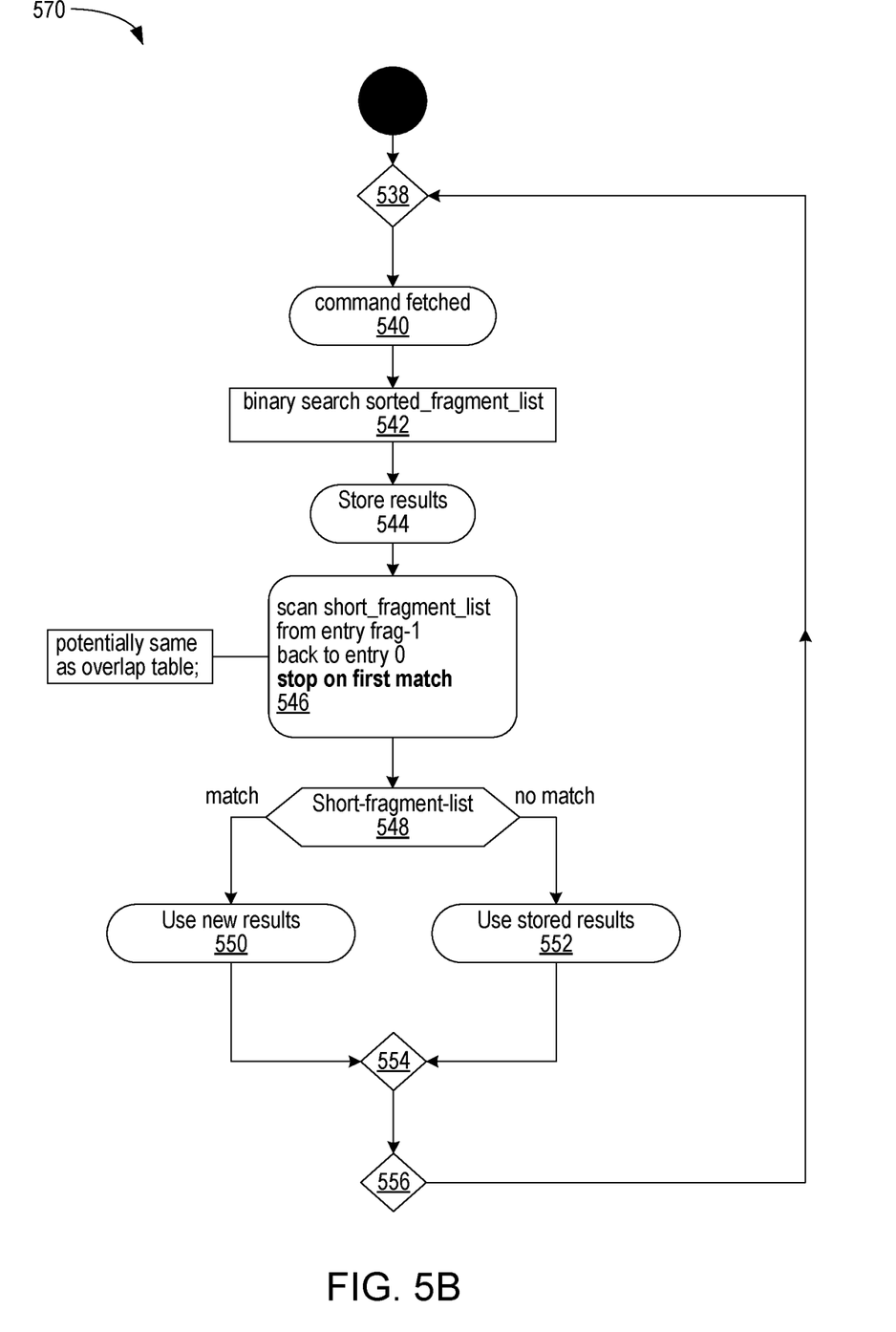
FIG. 5B is a flow chart illustrating a method of adding fragment flow, according to certain embodiments.

FIG. 5B is a flow chart illustrating a method 570 of adding fragment flow, according to certain embodiments. Method 570 continues with arriving commands. Arriving commands are first compared (binary search) to the long, sorted fragment list. The results are temporary stored. Then the short-unsorted-list is scanned. The last added entry that is a match should be used. This is so the list can be scanned either backwards (from frag_i) and stop upon first match, or forward and continue even if a match is found (until frag_i). If the short-list has a match, the results (Attributes) are taken from that match, if not the temporary stored results are used.

Method 570 continues at block 538 where the controller decides to proceed to block 540. At block 540, the controller fetches a command. At block 542, a binary search is executed on the sorted_fragment_list. At block 544, the controller stores the results of the binary search. At block 546, the controller scans the short_fragment_list from entry frag−1 back to entry 0. The controller will stop the scan on the first match. There is a potential for the short_fragment_list to be the same as the overlap table. At block 548, the controller determines whether there is a match in the overlap table. If the controller determines there is a match then method 570 proceeds to block 550. At block 550, the controller utilizes the new results found in the overlap table. If the controller determines there is no match then method 570 proceeds to block 552. At block 552, the controller utilizes the old results found in the defragment table. At the completion of either block 550 or block 552 method 570 proceeds to block 554. At block 554, the controller determines to proceed to block 556. At block 556, the controller determines to return to block 538.

By utilizing already existing logic or by adding new logic, the disclosure divides the time spent without fetching due to fragments addition. The denominator depends on the size of the short-fragmentation list. Advantages of using short fragmented lists for adding fragment entries include lowering the bandwidth impact upon adding new fragments which will increase the quality of service (QoS) by having continual command fetching during fragment adding.

In one embodiment, a data storage device comprises: a memory device; and a controller coupled to the memory device, wherein the controller is configured to: maintain a defragmentation table; receive a request to add a fragment to the defragmentation table; store the added fragment in a fragment list, wherein the fragment list is distinct from the defragmentation table; and update the defragmentation table with entries from the fragment list; and clear the fragment list. The controller is further configured to determine whether command fetching is idle. The controller is further configured to disable command fetching if command fetching is idle and then perform the updating followed by re-enabling command fetching. The controller is further configured to disable command fetching once the fragment list is full and then perform the updating. After the storing and prior to the updating, the controller is configured to: fetch a command; search the defragmentation table; search the fragment list; and process the command based upon results from either the defragmentation table or the fragment list. Searching the fragment list comprises searching from an end of the fragment list back to a beginning of the fragment list. Searching the fragment list comprises concluding searching upon finding a match to data of the command. Results from searching the fragment list are used if results are found from the searching the fragment list. Results from searching the defragmentation table are used if results are not found from the searching the fragment list. The fragment is a partial fragment.

In another embodiment, a data storage device comprises: a memory device; and a controller coupled to the memory device, wherein the controller is configured to: maintain a defragmentation table; maintain a fragment list, wherein the fragment list is distinct from the defragmentation table; fetch a command; search the defragmentation table for data of the command; store results of the search; search the fragment list for data of the command; determine whether the fragment list contains a match for the command; and utilize either the stored results or results of searching the fragment list for executing the command. In one embodiment searching the fragment list comprises searching from an end of the fragment list backwards towards a beginning of the fragment list until either the end of the fragment list is reached or data of the command is found. In another embodiment searching the fragment list comprises searching from a beginning of the fragment list to the end of the fragment list. Searching the fragment list comprises continuing to search to the end of the fragment list even after finding data of the command. Searching the fragment list occurs after searching the defragmentation table. The fragment list is disposed in an overlap table module and the defragmentation table is disposed in a fragments table module that is distinct from the overlap table module. The defragmentation table is sorted and wherein the fragment list is unsorted.

In another embodiment, a data storage device comprises: memory means; and a controller coupled to the memory means, wherein the controller is configured to: maintain a defragmentation table and a separate fragment list, wherein the fragment list is stored in an overlap table module and the defragmentation table is stored in a fragments table module; update the fragment list prior to updating the defragmentation table; and search the defragmentation table prior to searching the fragment list. The controller is further configured to update the defragmentation table with information from the fragment list, wherein updating the defragmentation table occurs when the fragment list is full. The controller is further configured to use information obtained from searching the fragment list and discard information obtained from searching the defragmentation table.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device; and
a controller coupled to the memory device, wherein the controller is configured to:
maintain a defragmentation table;
receive a request to add a fragment to the defragmentation table;
store the added fragment in a fragment list, wherein the fragment list is distinct from the defragmentation table; and
update the defragmentation table with entries from the fragment list; and
clear the fragment list.

2. The data storage device of claim 1, wherein the controller is further configured to determine whether command fetching is idle.

3. The data storage device of claim 2, wherein the controller is further configured to disable command fetching if command fetching is idle and then perform the updating followed by re-enabling command fetching.

4. The data storage device of claim 1, wherein the controller is further configured to disable command fetching once the fragment list is full and then perform the updating.

5. The data storage device of claim 1, wherein after the storing and prior to the updating, the controller is configured to:

fetch a command;
search the defragmentation table;
search the fragment list; and
process the command based upon results from either the defragmentation table or the fragment list.

6. The data storage device of claim 5, wherein searching the fragment list comprises searching from an end of the fragment list back to a beginning of the fragment list.

7. The data storage device of claim 6, wherein searching the fragment list comprises concluding searching upon finding a match to data of the command.

8. The data storage device of claim 5, wherein results from searching the fragment list are used if results are found from the searching the fragment list.

9. The data storage device of claim 8, wherein results from searching the defragmentation table are used if results are not found from the searching the fragment list.

10. The data storage device of claim 1, wherein the fragment is a partial fragment.

11. A data storage device, comprising:
a memory device; and
a controller coupled to the memory device, wherein the controller is configured to:
maintain a defragmentation table;
maintain a fragment list, wherein the fragment list is distinct from the defragmentation table;
fetch a command;
search the defragmentation table for data of the command;
store results of the search;
search the fragment list for data of the command;
determine whether the fragment list contains a match for the command; and
utilize either the stored results or results of searching the fragment list for executing the command.

12. The data storage device of claim 11, wherein searching the fragment list comprises searching from an end of the fragment list backwards towards a beginning of the fragment list until either the end of the fragment list is reached or data of the command is found.

13. The data storage device of claim 11, wherein searching the fragment list comprises searching from a beginning of the fragment list to the end of the fragment list.

14. The data storage device of claim 13, wherein searching the fragment list comprises continuing to search to the end of the fragment list after finding data of the command.

15. The data storage device of claim 11, wherein searching the fragment list occurs after searching the defragmentation table.

16. The data storage device of claim 11, wherein the fragment list is disposed in an overlap table module and the defragmentation table is disposed in a fragments table module that is distinct from the overlap table module.

17. The data storage device of claim 11, wherein the defragmentation table is sorted and wherein the fragment list is unsorted.

18. A data storage device, comprising:
memory means; and
a controller coupled to the memory means, wherein the controller is configured to:
maintain a defragmentation table and a separate fragment list, wherein the fragment list is stored in an overlap table module and the defragmentation table is stored in a fragments table module;
update the fragment list prior to updating the defragmentation table; and
search the defragmentation table prior to searching the fragment list.

19. The data storage device of claim 18, wherein the controller is further configured to update the defragmentation table with information from the fragment list, wherein updating the defragmentation table occurs when the fragment list is full.

20. The data storage device of claim 18, wherein the controller is further configured to use information obtained from searching the fragment list and discard information obtained from searching the defragmentation table.

\* \* \* \* \*